(12) United States Patent
Kearns et al.

(10) Patent No.: US 12,366,264 B2
(45) Date of Patent: Jul. 22, 2025

(54) ROTATIONAL JOINT AND METHOD OF MAKING SAME

(71) Applicant: MEVOTECH LP, Toronto (CA)

(72) Inventors: Tyler Kearns, Toronto (CA); Tanmay Singh, Toronto (CA)

(73) Assignee: MEVOTECH LP, Toronto (CA)

( * ) Notice: Subject to any disclaimer, the term of this patent is extended or adjusted under 35 U.S.C. 154(b) by 478 days.

(21) Appl. No.: 17/963,701

(22) Filed: Oct. 11, 2022

(65) Prior Publication Data

US 2024/0117838 A1    Apr. 11, 2024

(51) Int. Cl.
*F16C 11/06* (2006.01)

(52) U.S. Cl.
CPC ................. *F16C 11/0666* (2013.01)

(58) Field of Classification Search
None
See application file for complete search history.

(56) References Cited

U.S. PATENT DOCUMENTS

| 4,504,166 A | * | 3/1985 | Morin | F16C 11/069 |
| | | | | 403/147 |
| 4,681,475 A | * | 7/1987 | Kanegawa | F16C 11/069 |
| | | | | 403/135 |
| 5,078,531 A | * | 1/1992 | Sakai | F16C 11/0623 |
| | | | | 403/135 |
| 5,601,378 A | * | 2/1997 | Fukukawa | F16C 11/0638 |
| | | | | 403/135 |
| 5,855,447 A | | 1/1999 | Nemoto | |
| 6,109,816 A | | 8/2000 | Kenichiro | |
| 6,171,012 B1 | | 1/2001 | Westphal | |
| 9,291,195 B1 | * | 3/2016 | Parker | F16C 11/069 |

(Continued)

FOREIGN PATENT DOCUMENTS

| CN | 103277404 A | 9/2013 |
| KR | 10-2013-0005765 A | 1/2013 |
| KR | 10-2017-0036456 A | 4/2017 |

OTHER PUBLICATIONS

An International Search Report and Written Opinion, date of completion Dec. 20, 2023 in the corresponding PCT/CA2023/051335.

(Continued)

*Primary Examiner* — Daniel J Wiley
(74) *Attorney, Agent, or Firm* — NORTON ROSE FULBRIGHT CANADA LLP

(57) ABSTRACT

A rotating joint and methods of making same are provided. The rotating joint comprises a housing having an external mounting surface, and internal housing members defining an internal chamber with an internal surface forming a spherical segment symmetric about a center point. A stud having a longitudinal axis passes through the center point, and a proximal end having a surface defining a spherical segment matching the internal surface of the at least one internal housing member. The proximal end permits the stud to rotate about its longitudinal axis. A closure member secures the proximal end within the housing. The closure member comprises a non-right angled edge positioned between an external surface and a lateral surface of the closure member. A lip of the housing abuts the lateral surface and comprises a lamination coupled to the non-right angled edge for securing the proximal end within the internal chamber.

20 Claims, 11 Drawing Sheets

(56) References Cited

U.S. PATENT DOCUMENTS

| | | | |
|---|---|---|---|
| 10,047,788 B2* | 8/2018 | Matsuura | F16C 11/0685 |
| 10,954,995 B2* | 3/2021 | Sugg | F16C 11/0623 |
| 11,215,221 B1* | 1/2022 | Suzuki | F16C 11/068 |
| 2010/0008714 A1* | 1/2010 | Bohne | F16C 11/069 |
| | | | 403/138 |
| 2013/0114996 A1 | 5/2013 | Kraatz | |
| 2013/0121754 A1* | 5/2013 | Kuroda | F16C 11/069 |
| | | | 29/505 |
| 2013/0121756 A1* | 5/2013 | Mevorach | F16C 11/0642 |
| | | | 403/144 |
| 2014/0205366 A1* | 7/2014 | Mevorach | F16C 11/0685 |
| | | | 403/144 |
| 2016/0025129 A1 | 1/2016 | Parker et al. | |
| 2017/0350441 A1* | 12/2017 | Parker, Jr. | F16C 11/08 |
| 2019/0277334 A1* | 9/2019 | Sugg | F16C 11/0657 |
| 2019/0353200 A1* | 11/2019 | Parker | F16C 43/02 |
| 2019/0390706 A1* | 12/2019 | Gräber | F16C 11/069 |
| 2020/0400187 A1* | 12/2020 | Smith | F16C 11/0628 |
| 2021/0270314 A1* | 9/2021 | Auquier | F16C 11/12 |

OTHER PUBLICATIONS

Wayken Rapid Manufacturing, "Fillet vs Chamfer: A Complete Guide for Applications", Nov. 1, 2021 (Nov. 1, 2021), [online] [retrieved on Dec. 13, 2023 (Dec. 13, 2023)], retrieved from the internet at <https://waykenrm.com/blogs/fillet-vs-chamfer-a-completeguide- for-applications.

* cited by examiner

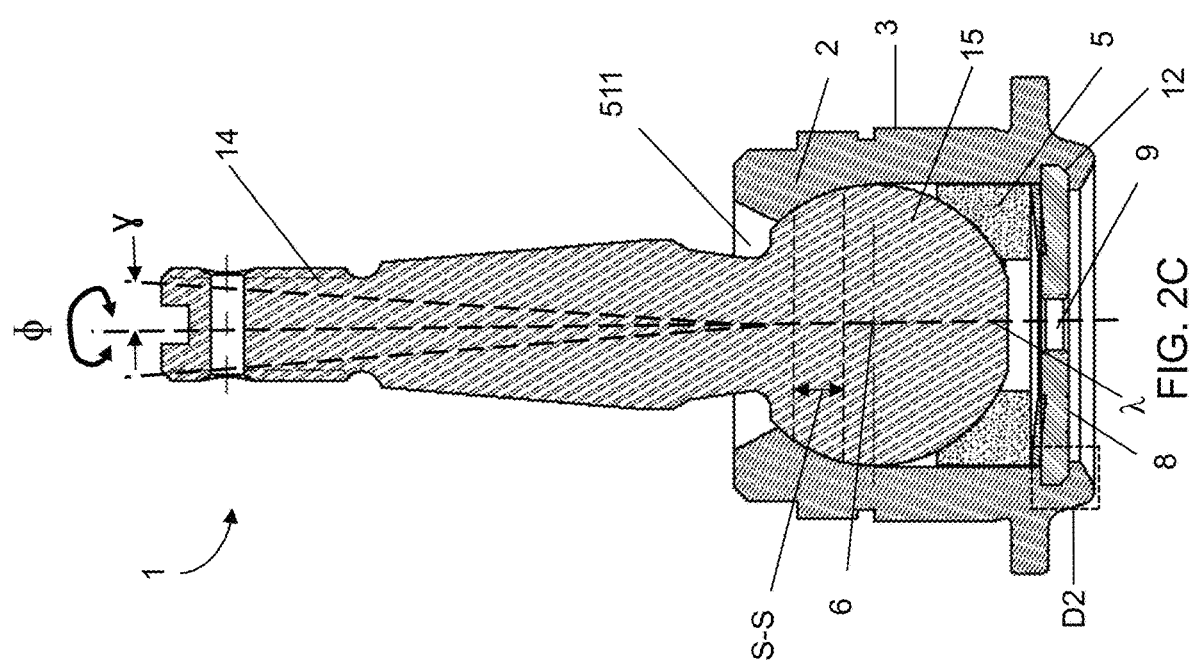

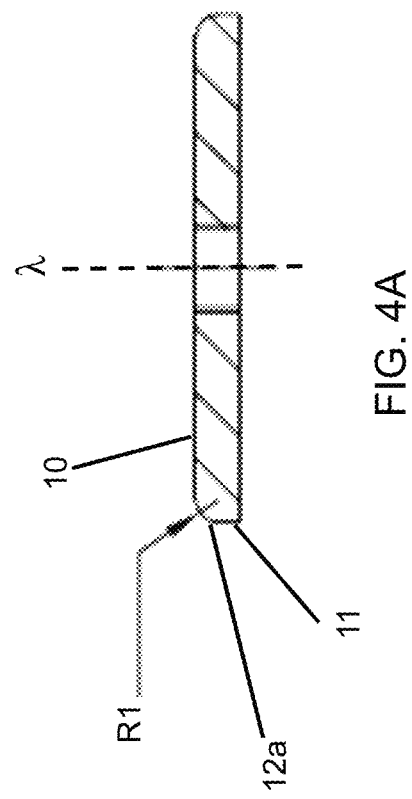
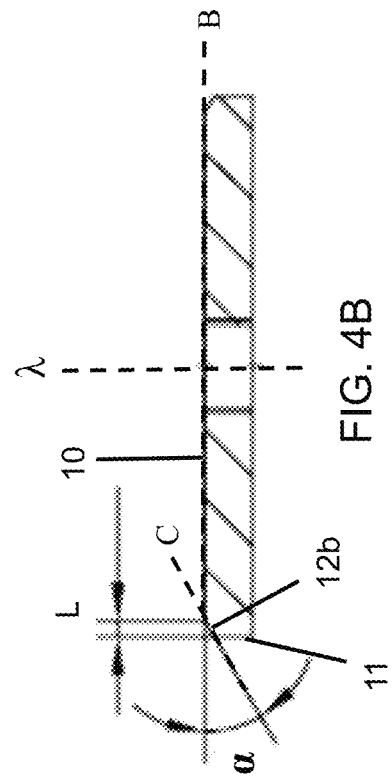
FIG. 4A
FIG. 4B

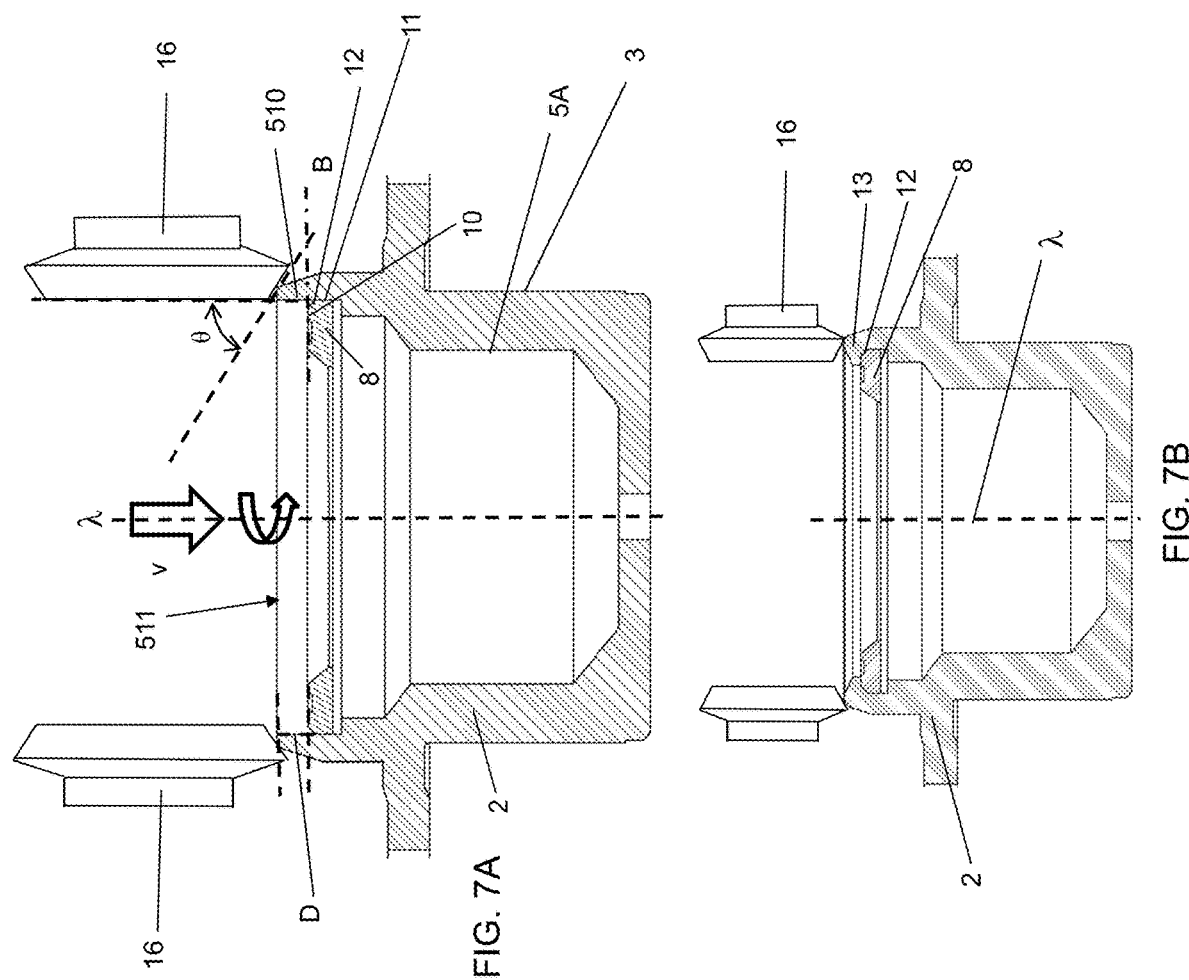

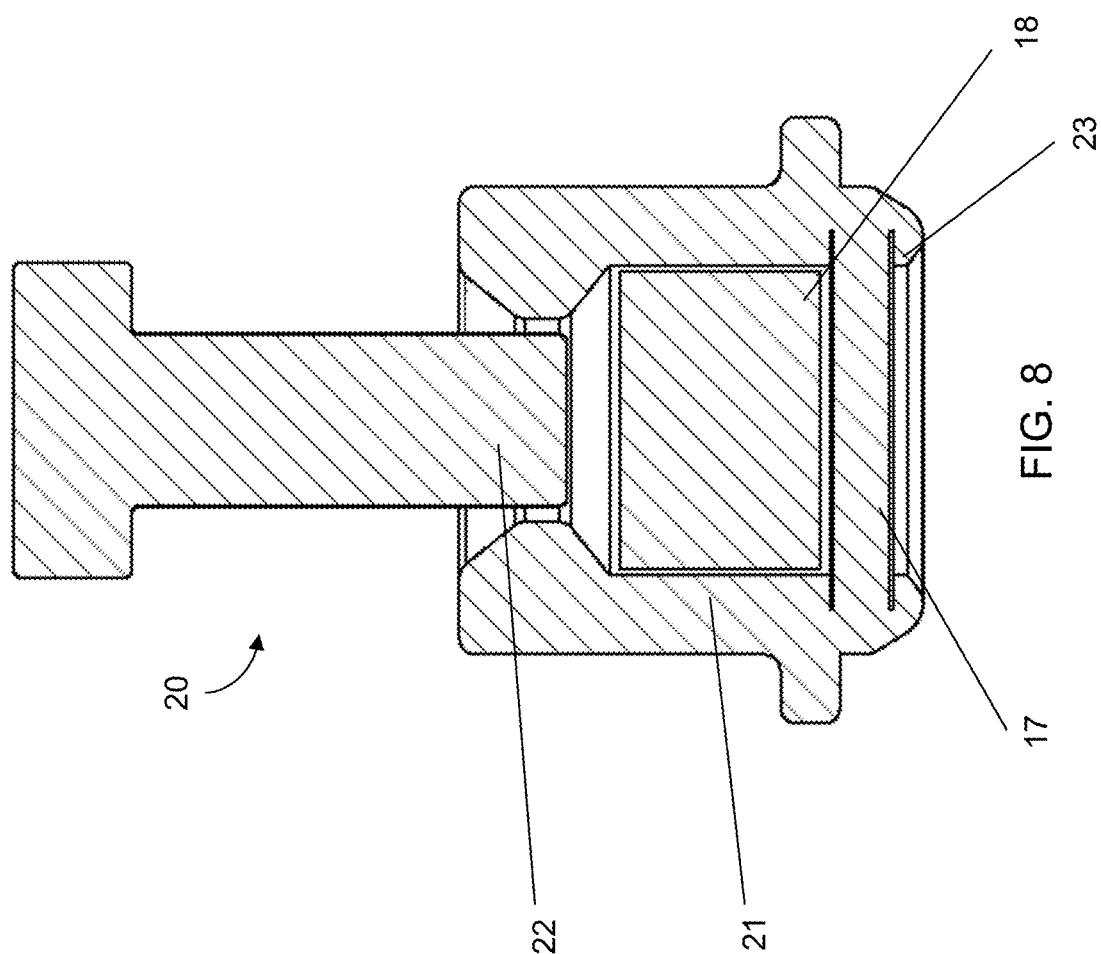

ROTATIONAL JOINT AND METHOD OF MAKING SAME

TECHNICAL FIELD

The disclosure relates generally to an automotive rotating joint, and more particularly to cap of a housing of the automotive rotating joint.

BACKGROUND

Rotational joints, such as ball joints, may included laminations to couple components of the rotational joint together. In the example illustrated in FIG. 1A a cutaway view of a rotational joint 1, shown as a ball joint, having a lamination 13' of a housing lip onto a closure plate 8', (also referred to herein as a "closure member", "cap end", or "backing plate"). Laminating the lip of a rotational joints housing over the cap end may hold the internal components, i.e. the cap end 8', ball portion 15' of stud 14', and boot 17' in position within the internal chamber of the housing. As shown in FIGS. 1A and 1B, the lamination 13' extends over a right angled straight edge 12' of the cap end 8'. The small surface area of the right angle straight edge 12' extending along the vector defined by edge 12' provides little coupling area between the lamination 13' and cap end 8'. Lateral surface 11' of cap end 8' also has little contact with lamination 13'. Rather, the interface between the lamination 13' an external cap end surface 10' holds the internal components of the rotational joint in position. However, as the lamination 13' bends over the right angled edge 12' of cap end 8' during manufacturing, lamination 12' may only contact a marginal surface of the cap end either on the lateral surface 11' or the external surface 10' of the cap end 8'. As a result, the cap end 8' may be misaligned or move during use of the rotational joint 1' causing the cap end 8' and internal components of the rotational joint 1' to wear out reducing the service life of the rotational joint.

Features that distinguish the present invention from the background art will be apparent from review of the disclosure, drawings and description of the invention presented below.

SUMMARY

In one aspect, the disclosure describes a rotating joint comprising: a housing comprising: an external mounting surface for coupling to a component; at least one internal housing member defining an internal chamber with an internal surface forming a spherical segment symmetric about a center point; a stud having: a longitudinal axis passing through the center point, a proximal end having a surface defining a spherical segment, the proximal end having a surface defining a spherical segment, the surface of the proximal end matching the internal surface of the at least one internal housing member, the proximal end configured to permit the stud to rotate about its longitudinal axis, and optionally swing to an angle relative to the center point; a closure member for securing the proximal end within the housing, the closure member comprising a non-right angled edge positioned between an external surface and a lateral surface of the closure member; a lip positioned on the housing abutting the lateral surface, the lip comprising a lamination coupled to the non-right angled edge for securing the proximal end within the internal chamber.

In some embodiments, the internal housing members comprises an inner race.

In some embodiments, the closure member is a plate defining an aperture opposite the base end, the external surface opposing a base end of the housing, the stud extending through the aperture.

In some embodiments, the non-right angled edge comprises an angled surface having a tangent at a first angle with respect to a first plane defined by a first tangent of the external closure member surface and a second angle with respect to a second plane defined by a second tangent of the lateral surface. The first or second angle may be in a range of 1-45 degrees, in a range of 10-30 degrees, or approximately 20 degrees. The angled surface of the non-right angled edge may have a length of 0.5-2 mm, 0.8-1.5 mm, or greater than 1 mm. The lamination may have a thickness along the length of the lamination of greater than 0.7 mm; in a range of 1.4-2.3, and/or in a range of 1.4-1.7 mm. The lamination may have an approximately even thickness along the length of the lamination. The lamination may have a tapered cross-section. A depth of the lip may be in a range of 5 mm to 10 mm, and/or in a range of 5.5 mm to 7 mm.

In some embodiments, the non-right angled edge comprises one of an arcuate curve, a filleted edge, a chamfered edge, a beveled edge.

In some embodiments, the lip couples to the non-right angled edge, the external closure member surface, and the lateral surface.

In some embodiments, the component is a control arm, a tie rod, or a stabilizer link.

Embodiments may include combinations of the above features.

In another aspect, the disclosure describes a method comprising: providing a housing having: an external mounting surface for coupling to a component; an internal chamber with an internal surface forming a spherical segment symmetric about a center point; and a lip defining an aperture; positioning a stud within the internal chamber, the stud having: a longitudinal axis passing through the center point, a proximal end having a surface defining a spherical segment, the surface of the proximal end matching the internal surface of the at least one internal housing member, the proximal end configured to permit the stud to rotate about its longitudinal axis, and optionally swing to an angle relative to the center point; positioning a closure member within the housing to secure the proximal end within the housing, the closure member comprising a non-right angled edge positioned between an external surface and a lateral surface of the closure member; and positioning the lip laterally adjacent to and abutting the closure member, the lip extending away from a plane defined by the external closure member surface; laminating the lip to the non-right angled edge of the closure member to form a lamination.

In some embodiments, laminating the lip comprises forcing a die surface of a die into the lip, the die surface defining a plane positioned at an die angle relative the longitudinal axis of the housing; and moulding the lip against the non-right angled edge to form a lamination, the lamination having a length and a thickness. The die may be a rotating die, and laminating the lip may comprise: rotating the die or the housing about a longitudinal axis of the housing at a rotational speed; and feeding the die toward the lip at a feed speed. The die angle may be at least one of: in a range of 45-70 degrees, and/or approximately 61.5 degrees. The rotational speed may be at least one of: in a range of 100-200 rpm, and/or approximately 150 rpm. The feed speed may be in a range of 0.01 mm/s to 0.5 mm/s, preferably approximately 0.2 mm/s.

In some embodiments, the lamination has a thickness along the length of the lamination of at least one of: greater than 0.7 mm; in a range of 1.4-2.2, and/or in a range of 1.4-1.7 mm.

In some embodiments, the lamination has an approximately even thickness along the length of the lamination.

In some embodiments, the lamination has a tapered cross section.

In some embodiments, the lip has a depth of at least one of: in a range of 5 mm to 10 mm, and/or in a range of 5.5 mm to 7 mm.

In some embodiments, the non-right angled edge comprises an angled surface having a tangent at an first angle with respect to a first plane defined by a first tangent of the external closure member surface and a second angle with respect to a second plane defined by a second tangent of the lateral surface. The first or second angle may be: in a range of 1-45 degrees, in a range of 10-30 degrees, or approximately 20 degrees.

In some embodiments, the non-right angled edge comprises one of an arcuate curve, a filleted edge, a chamfered edge, a beveled edge.

In some embodiments, the lamination couples to the non-right angled edge, the external closure member surface of the closure member, and the lateral surface.

Embodiments may include combinations of the above features.

In a further aspect, the disclosure describes a mechanical assembly comprising: a suspension or steering member coupled to a rotating joint, the rotating joint comprising: a housing having: an external mounting surface for coupling to a component; at least one internal housing member defining an internal chamber with an internal surface forming a spherical segment symmetric about a center point; a stud having: a longitudinal axis passing through the center point, a proximal end having a surface defining a spherical segment, the surface of the proximal end matching the internal surface of the at least one internal housing member, the proximal end configured to permit the stud to rotate about its longitudinal axis, and optionally swing to an angle relative to the center point; a closure member for securing the proximal end within the housing, the closure member comprising a non-right angled edge positioned between an external surface and a lateral surface of the closure member; a lip positioned on the housing abutting the lateral surface, the lip comprising a lamination coupled to the non-right angled edge for securing the proximal end within the internal chamber.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 2C is a cross-sectional view of another embodiment of the rotational joint of FIG. 2A along the line A-A;

FIGS. 4A and 4B show cross-sectional views of example closure members having a non-right angled edge:

FIG. 7A shows a cut away view of an example housing of an example rotational joint prior to being laminated with a rotational die according to this disclosure;

FIG. 7B shows a cut away view of an example housing of an example rotational joint after being laminated with a rotational die according to this disclosure;

FIG. 8 shows a cross-sectional view of an example test jig for testing a lamination to a closure member;

DETAILED DESCRIPTION

The following disclosure relates to rotational joints for motor vehicles. In an aspect, a rotating joint for driveline, steering and suspension parts in automobiles, and associated methods of making the rotating joint are provided. In some embodiments, the disclosed rotational joint comprises a ball stud where the ball portion of the ball stud is secured within a housing by an end cap having a non-right angle edge allowing for improved stress dispersion when the housing is laminated over the non-right angle edge.

Although terms such as "maximize", "minimize" and "optimize" may be used in the present disclosure, it should be understood that such term may be used to refer to improvements, tuning and refinements which may not be strictly limited to maximal, minimal or optimal.

The term "connected" or "coupled to" may include both direct coupling (in which two elements that are coupled to each other contact each other) and indirect coupling (in which at least one additional element is located between the two elements).

The term "substantially" as used herein may be applied to modify any quantitative representation which could permissibly vary without resulting in a change in the basic function to which it is related.

Terms such as "up to", "at least", "greater than", "less than", "more than", "or more", and the like, include the number recited and such terms refer to ranges that can be subsequently broken down into sub-ranges. In the same manner, all ratios recited herein also include all sub-ratios falling within the broader ratio.

The singular forms "a," "an," and "the" include the plural reference unless the context clearly dictates otherwise. The term "and/or" means any one of the items, any combination of the items, or all of the items with which this term is associated.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

The term "lamination" as used herein may refer to a portion of a housing overlaid onto a closure member described herein. The overlay may bond the materials of the housing and closure member by pressure to secure the housing and closure member stationary relative to each other. Similarly, the term "laminating" may refer to a process of overlaying a portion of a housing onto a closure member described herein to secure the housing and closure member stationary relative to each other.

Aspects of various embodiments are described through reference to the drawings.

Figure 2B:
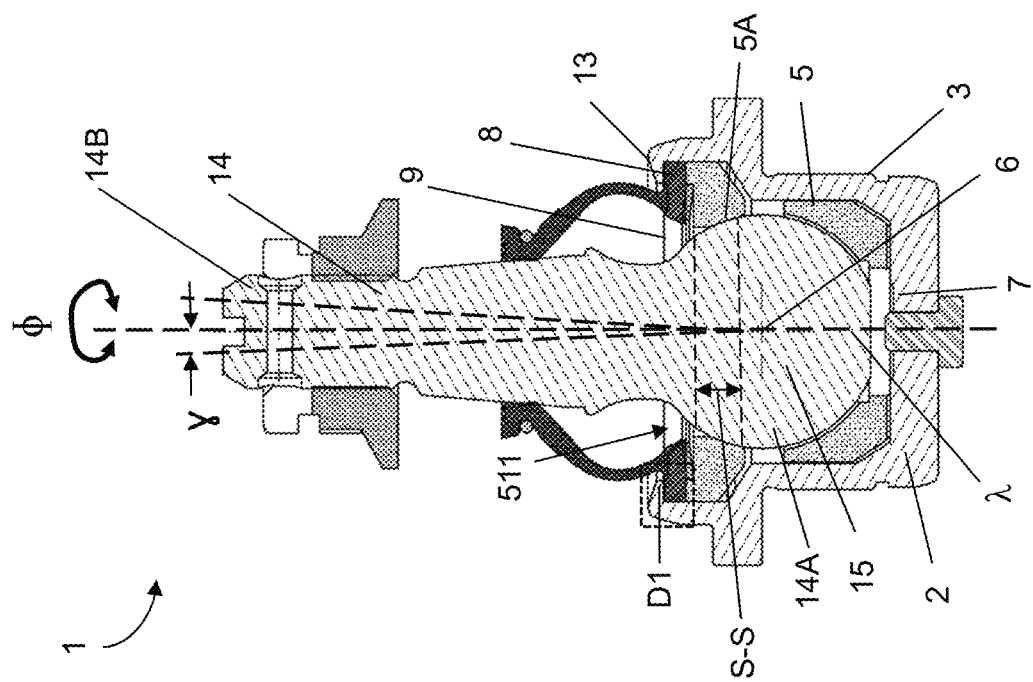
FIG. 2B is a cross-sectional view of an embodiment of the example rotational joint of FIG. 2A along the line A-A.
Figure 2A:
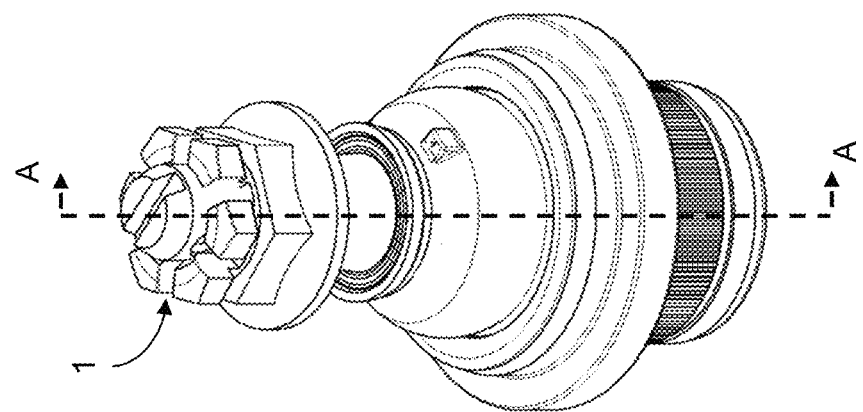
FIG. 2A is a perspective view of an example rotational joint according to this disclosure.

FIG. 2A illustrates an example rotating joint 1 according to this disclosure. FIG. 2B illustrates an cross-sectional view of a rotating joint 1 along the line A-A of FIG. 2A. Rotating joint 1 is illustrated as a ball joint but may be any other type of rotating joint. As shown, rotating joint 1 comprises a stud 14 having proximal end 14A contained within a housing 2. Proximal end 14A of stud 14 may have a exterior surface defining a spherical segment S-S and may couple to internal housing members 5 forming a socket to receive the proximal end 14A. A distal end 14B of stud 14 may extend through aperture 511 defined by housing 2 for coupling to a component (not shown) of an automobile. In an example, proximal end 14A, may be a ball portion of a ball stud, and may allow rotation of stud 14 about its longitudinal axis $\phi$ and/or for the stud 14 to pivot at an angle $\gamma$ relative to its longitudinal axis $\phi$ and about the center point. Proximal end 14A may have various sizes, in non-limiting examples proximal end 14A defining a spherical segment S-S having a diameter of 25 mm, 30 mm, or 35 mm. The housing 2 may have internal housing members 5 defining an internal chamber having a generally spherical internal surface 5A symmetrically about a center point 6. Internal housing members 5, for example an inner race and/or a bearing, may define the internal chamber. The internal surface of the internal chamber may be configured to abut and define the surface of proximal end 14A. The internal chamber may comprise base end 7, and closure member 8 opposite the base end 7 as shown in FIG. 2B illustrating a closed top design.

Figure 3:
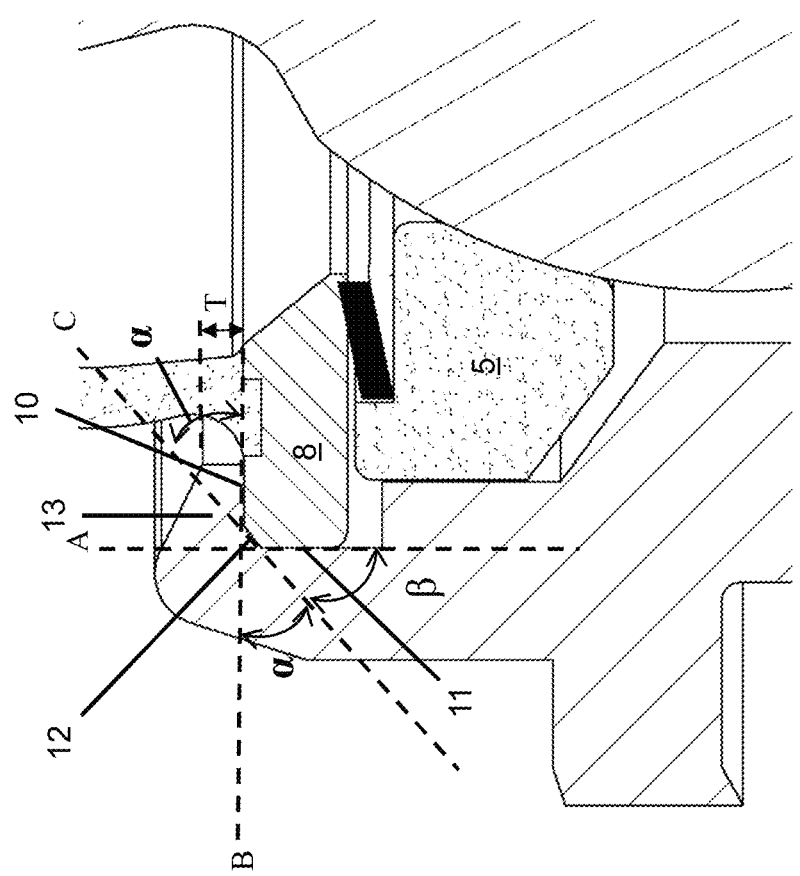
FIG. 3 shows an fragmentary view of detail D1 of FIG. 2B illustrating a non-right angled edge.

As shown in FIG. 2B, closure member 8 may have an aperture 9 opposite the base end 7 through which stud 14 protrudes from the housing 2, and an external closure member surface 10 and a lateral surface 11, which are illustrated in FIG. 3, may be coupled to lamination 13 for securing the proximal end 14A within the housing 2. Lateral surface 11 of closure member 8 may be positioned toward an inner surface of housing 2 and/or in a direction perpendicular to a longitudinal axis $\lambda$ housing 2 along radial lines extending from longitudinal axis $\lambda$. External closure member surface 10 may be positioned in a direction parallel to longitudinal axis $\lambda$. In some embodiments, rotating joint 1 may be a closed bottom design as shown in FIG. 2C. Closure member 8 may positioned at a base end opposing aperture 551 through which stud 14 extends. The closure member 8 of FIGS. 2B and 2C may each comprise a non-right angled edge 12 which is illustrated in FIG. 3. Closure member 8 may be a plate, or have suitable dimension to seal secure the proximal end 14A with housing 2. As shown in FIG. 3, a non-right angled edge 12 is between the external closure member surface 10 and the lateral surface 11. Proximal end 14A may be secured in place within the housing 2 by lamination 13 coupling housing 2 to non-right angled edge 12, lateral surface 11, and/or external closure member surface 10. Proximal end 14A and stud 14 may be free to rotate within the housing 2 about longitudinal axis $\phi$ or pivot at angle $\gamma$ relative to center point 6.

Figure 1A:
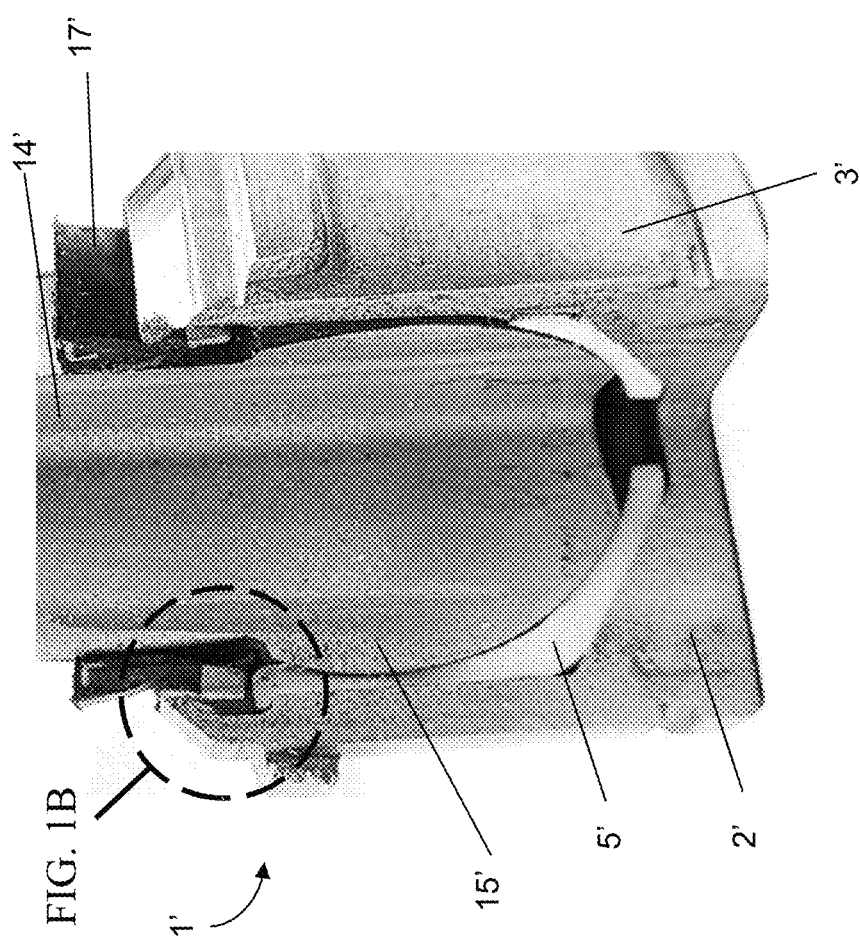
FIG. 1A shows a cut away view of a prior art assembly as described above.

FIG. 3 shows an fragmentary view of detail D1 of FIG. 2B illustrating non-right angled edge 12. While FIG. 3 illustrates a top closed design, closure member 8, having a non-right angled edge 12 described herein, may also be incorporated into a bottom closed design. For example, detail D2 of FIG. 2C illustrates a non-right angle edge which may have the same arrangement described herein with respect to detail D1. Non-right angled edge 12 may comprise an angled surface having a tangent defining a plane C at an angle $\alpha$ to plane B defined by the tangent to the external cap end surface 10. Angled surface of non-right angled edge 12 may also have a tangent at defining plane C at a second angle $\beta$ to plane A defined by a tangent to the lateral surface 11. In an embodiment, both angles $\alpha$ and $\beta$ may be in the range of 1-45 degrees. In another embodiment, both angles $\alpha$ and $\beta$ may be in the range of 10-30 degrees. In another embodiment, both angles $\alpha$ and $\beta$ may be about 20 degrees. In some embodiments the non-right angled edge 12 is an arcuate curve, a filleted edge, a chamfered edge, or a beveled edge. FIG. 4A shows a cross-sectional view of an example closure members, illustrates as a plate, having a non-right angled edge 12a having a substantially arcuate curve having a radius R1. In some embodiments, radius R1 may be in a range of 0.5-2 mm. In an example, R1 may be about 1 mm or 1.5 mm. FIG. 4B shows a cross-sectional view of another example closure plate having a non-right angled edge 12b. As shown in FIG. 4B, non-right angled edge 12b may comprise an angled surface having a tangent defining a plane C at an angle $\alpha$ which may be about 30-45 degrees. Cross-sectional length L, which is a length of non-right angled edge when viewed from a plane view, may be in a range of 0.1 mm to 10 mm. In an example, cross-sectional length L is about 0.5-1 mm. A non-right angled edge may allow stress placed on the rotating joint to be dispersed over a larger surface area defined by the non-righted angled edge 12, in comparison to a right angled straight edge, providing improved durability and reduced susceptibility to breaking under stress in comparison to example rotational joint 1' shown in FIG. 1A.

A length of non-right angled edge 12 may be variable depending upon the size and design of the rotational joint. The length of the non-right angled edge 12 may be a distance along the surface of non-right angled edge 12 between the margin of lateral surface 11 and the margin of external cap end surface 10. Non-right angled edge 12 may comprise a plurality of surfaces or fillets, e.g. defining a generally arcuate shoulder. The length of the non-right angled edge 12 may then be the distance along the surface of non-right angled edge 12 between the margin of lateral surface 11 and the margin of external cap end surface 10 over the plurality of surfaces or fillets. As such, the area defined by the non-right angled edge 12 may be defined by the length and circumference of the closure member. In an embodiment the non-right angled edge has a length of 0.5-2 mm. In another embodiment, the length may be 0.8-1.5 mm. In another embodiment, the length may be greater than 1 mm. Lamination 13 coupling housing 2 to non-right angled edge 12 may have variable thickness T along its length, or have a generally even thickness T along its length as shown in FIG. 3. In an embodiment, lamination 13 has a tapered cross section as shown in FIG. 3. Some embodiments may have a lamination thickness greater than 0.7 mm, in a range of 1.4-2.3 mm, or in a range of 1.4-1.7 mm. A length of lamination 13, which approximately corresponds to depth D of a lip of the housing shown in FIG. 7A. Length of lamination 13 may vary to extend the lamination 13 over external cap end surface 10 in addition to non-right angled edge 12. In an embodiment, the depth of the lip may be between 5-10 mm or in a range between 5.5-7 mm. As shown in FIG. 7A, depth D of the lip 510 may be a distance between a distal tip of lip and a proximal end of lip 510 intersecting plane B defined by the external surface of closure member.

Figure 5:
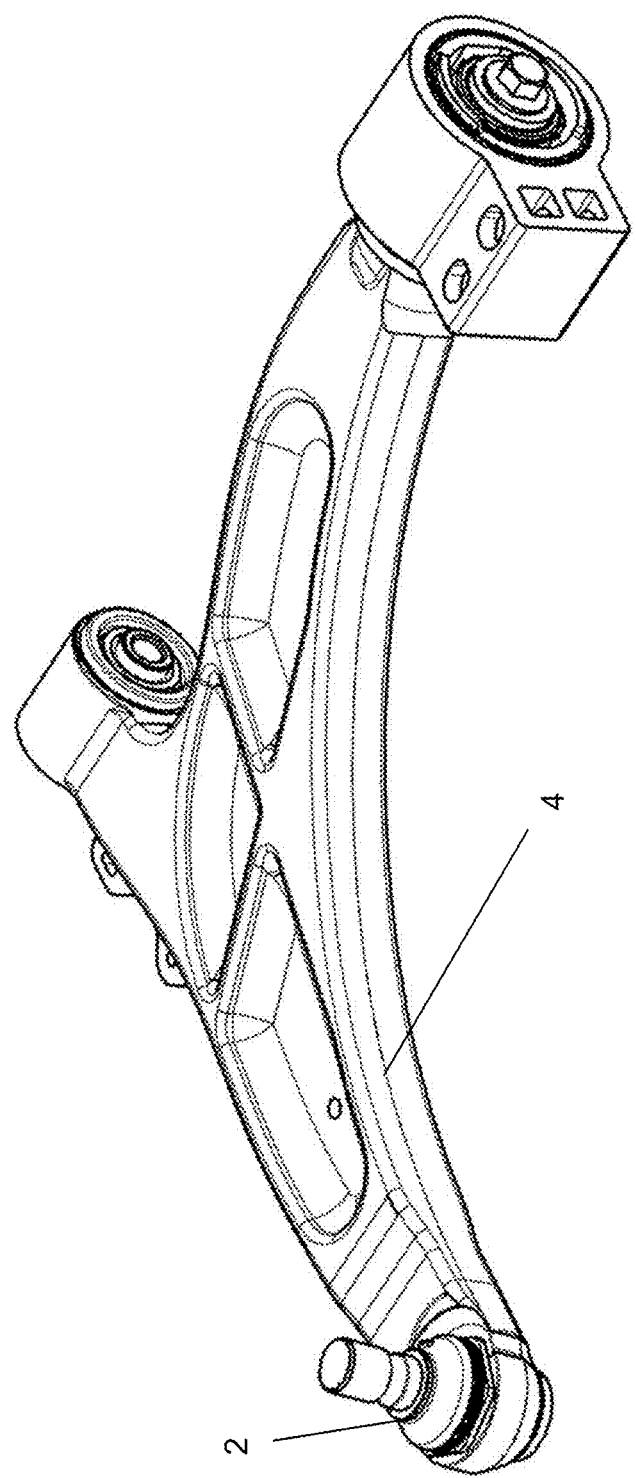
FIG. 5 shows a perspective view of control arm comprising a rotational joint of FIG. 2A.

Housing 2 may comprise an external mounting surface 3 for coupling to at least one external component 4, for example a control arm illustrated in FIG. 5 and another component (not shown) to allow relative rotational movement between external component 4 and the other component. In some embodiments, rotating joint 1 described herein may be coupled to a suspension or steering member to form a mechanical assembly. For example, a mechanical assembly may for formed by coupling rotating joint 1 with component 4. In some embodiments, component 4 may be a control arm, a stabilizer link, or a tie rod.

Figure 6:
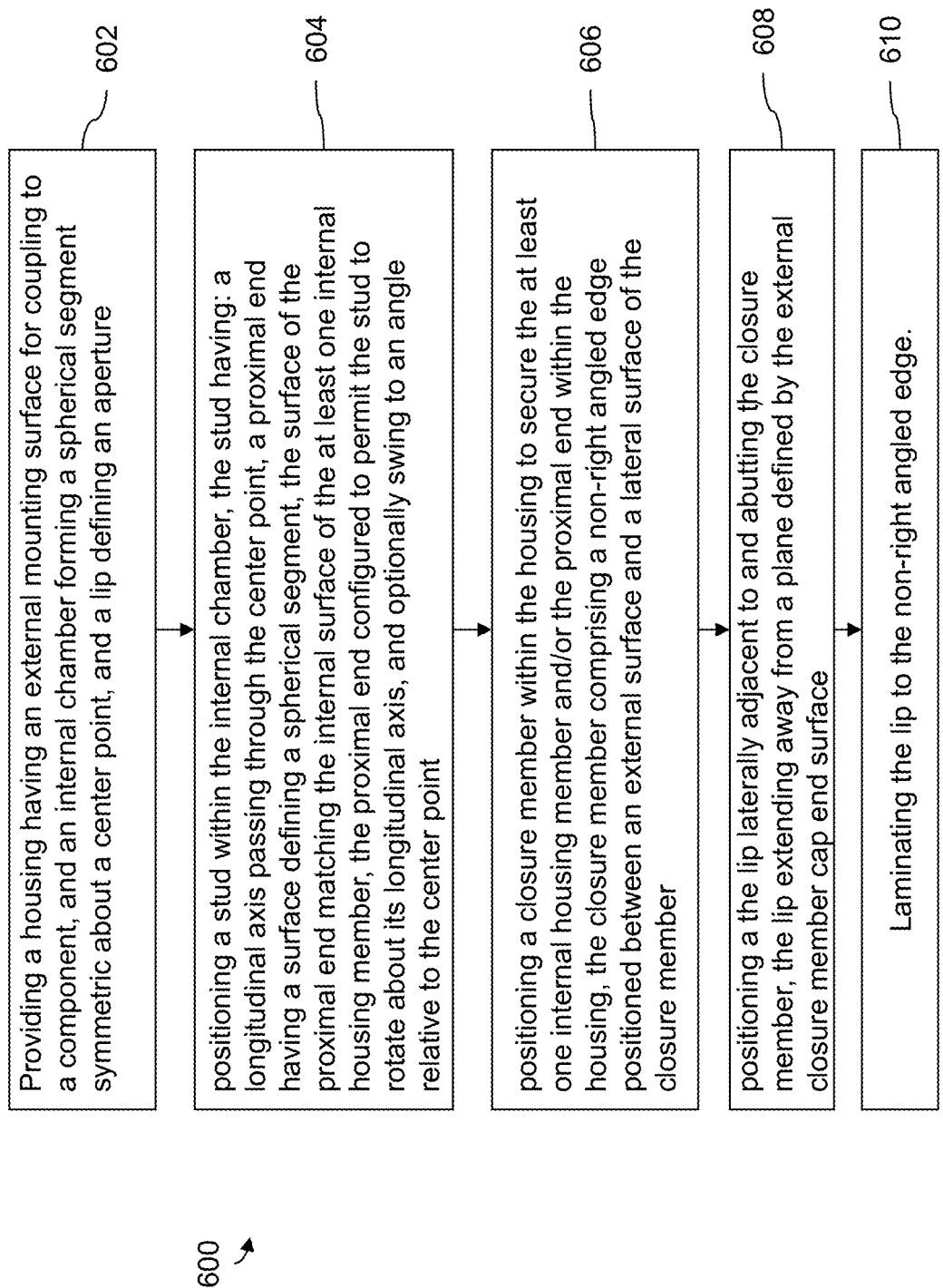
FIG. 6 shows a schematic view of a flow chart illustrating an example method of manufacturing a rotational joint according to this disclosure.

A method of manufacturing a rotational joint according to this disclosure is described with reference to method 600 illustrated in the flow chart of FIG. 6. FIGS. 7A and 7B further illustrate representations of an embodiments of method 600.

At 602 a housing, for example housing 2 as shown in FIGS. 7A, may be provided with an external mounting surface 3 for coupling to a component. Housing 2 may comprise at least one internal housing member defining an internal chamber with an internal surface 5 forming a spherical segment symmetric about a center point 6. Housing 2 may comprise lip 510 defining aperture 511 through which a closure member 8 may be positioned.

At 604, a stud (shown in FIGS. 2B and 2C but excluded form FIGS. 7A and 7B to simplify the figures) may be positioned within the internal chamber. The stud 14 may have: a longitudinal axis passing through a center point of proximal end 14A of the stud, the proximal end may be have a surface defining a spherical segment S-S as shown in FIGS. 2B and 2C. The surface of proximal end 14A may have an external surface matching the internal surface of the at least one internal housing member, where the proximal end is configured to permit the stud to rotate about its longitudinal axis, and optionally swing to an angle relative to the center point.

At 606, a closure member 8 may also be positioned within the housing to secure the at least one internal housing member and/or proximal end 14A of the stud 14 within housing 2. Closure member 8 comprises a non-right angled edge positioned between external surface 10 and a lateral surface 11 of closure member 8. The external surface 10 may be positioned in a direction parallel to longitudinal axis λ of housing 2, e.g. external surface 10 may have a tangent perpendicular to longitudinal axis λ of housing and positioned away from the internal surfaces of housing 2 as shown in FIG. 7A. The lateral surface 11 may be positioned adjacent to and abut lip 510 of housing 2 and/or positioned toward lip 510 in a direction perpendicular to longitudinal axis λ along a radial line from longitudinal axis λ.

At 608, Lip 510 of housing 2 may be provided adjacent to and/or abutting lateral surface 11. Lip 510 may extend away from a plane B defined by a tangent of the external closure member surface 10.

At 610, lip 510 may be laminated to the non-right angled edge 12 of the closure member 8 to form lamination 13. Closure member 8 may define an aperture through which a stud may extend, and closure member may be positioned opposing a base end of housing 2 such that housing 2 is top closed. In another embodiment, housing may be bottom closed where closure member 8 is positioned opposite aperture 511 to form base end of housing 2. As shown in FIG. 7A, a rotating die 16 may rotate about a perimeter of housing 2 and longitudinal axis λ of the housing. Die 16 may have a surface at roller angle 9 relative to longitudinal axis λ as die 16 is fed to towards lip 510 at a feed speed v to laminate lip 13 against non-right angled edge 12 as shown in FIG. 7A to form lamination 13 as shown in FIG. 7B. Angle θ of the die 16 may be in a range of 45-70 degrees in some embodiments. In a specific example, angle θ may be about 61.5 degrees.

In an embodiment, feed speed v may be configured to provide consistent laminations while minimizing stresses applied to lip 510. In some embodiments, feed speed v may be in a range of 100-200 rpm. In other examples, feed speed v may be about 150 rpm, 0.01-0.05 mm/s, or 0.2 mm/s. Feed speed may vary depending upon metallurgy of housing 2, and the length, thickness, and shape of lip 510.

In an embodiment, prior to laminating closure member 8 to housing 2, closure member 8 may be separate and not coupled to housing 2, where housing 2 defines an aperture 511 through which internal housing members 5, and/or proximal end 14A of stud 14 may be inserted and positioned within housing 2. Closure member 8 may then be positioned to secured internal housing members 5, and/or proximal end 14A of stud 14 within housing 2, and be laminated by lip 510 to coupled closure member 8 to housing 2.

EXAMPLES

The strength of example laminations according this disclosure were evaluated to determine their ability to withstand pull out forces. Stress analysis of the rotational joint was also undertaken.

Example laminations were tested using a manufactured test jig 20 comprising a cap plate 17, and stock bar 18 a configured to be inserted into the housing 21 to abut and apply pressure to cap plate 17 within the housing 21 as shown in FIG. 8 to push against lamination 23 of housing 21.

Housing blanks were created with varying structural characteristics and manufacturing methods for varying sphere sizes at 25, 30, and 35 mm. Stock bar 18 was inserted into each blank housing, and the stock bar dimensions matched that of the housing blank.

Each pushout test was conducted on a laminated housing assembly using the test jig as shown in FIG. 8 with member 22 applying force to the stock bar 18 until lamination 23 failed, i.e. cap plate 17 was push out of housing 21 by deforming lamination 23. The force required to cause lamination 23 to fail was measures and recorded.

The lamination lip height as well as the sphere size were varied for various tests. All parameters and stress profiles were recorded in order to assess lamination strength measured through the pushout load. In one test, with a sphere size of 25 mm and a lamination lip thickness (T in FIG. 3) of 1.5 mm the minimum pushout load is 57.39 KN when the lamination lip height is 5.5 mm and a highest tested pushout load of 85.14 KN when the lamination lip height is 7.5 mm.

In another test, pushout load was compared to lamination width for three example lamination lip heights having a housing for a sphere size for a 25 mm diameter ball portion of a ball stud. The three lamination lip heights were 7.0 mm, 6.0 mm and 5.5 mm, and a approximately linear relationship was found between pushout load and lamination width for each lamination lip height studied. The force required to push through the lamination has a positive trend upwards as both the lamination width and depth increase. With a lamination width of 0.7 mm and a height of 5.5 mm the load required to break the example lamination was 46.28 KN. The example lamination width of 1.5 mm and a height of 7 mm had a pushout load of 87.13 KN.

Figure 1B:
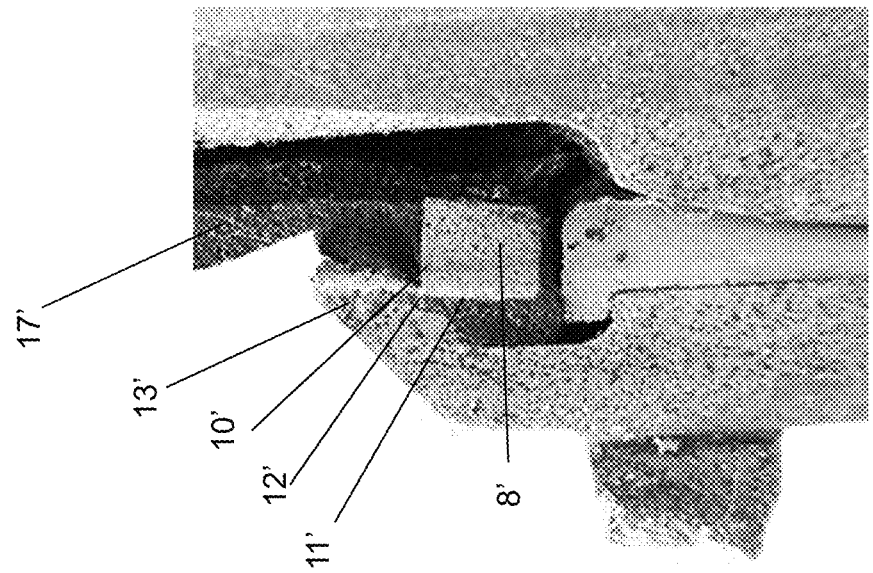
FIG. 1B is a fragmentary view of FIG. 1A showing a lamination and closure plate of the prior art assembly.
Figure 9B:
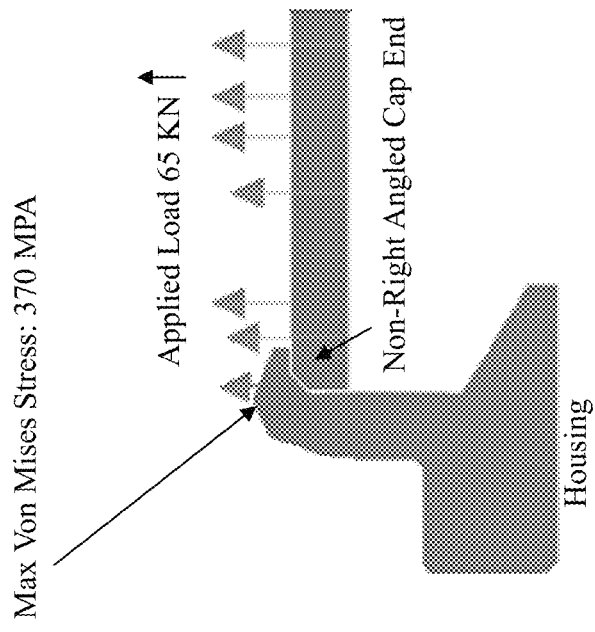
FIG. 9B shows a finite element analysis model of a simulated stresses when a force is applied to a closure member having a non-right angled edge coupled to a lamination.
Figure 9A:
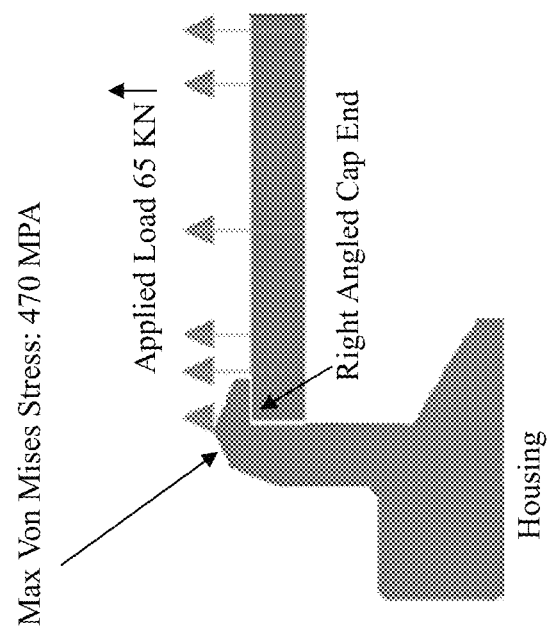
FIG. 9A shows a finite element analysis model of simulated stresses when a force is applied to a closure member having a right angled edge coupled to a lamination.

FIG. 9A shows finite element analysis model of a simulation pull out test conducted on a ball joint having a right angled edge of a cap end. FIG. 9B shows a finite element analysis model of the same pull out test conducted on a lamination of a non-right angled edge, specifically a chamfered edge at about a 45° angle to adjacent external cap end surface and lateral surface, of an closure member where all other variable were kept constant. As shown in FIG. 9B, the maximum stress experienced by the lamination lip is significantly reduced when using a non-right angled edge in comparison to FIG. 9A which utilizes a right angled edge such as the one illustrated in FIGS. 1A and 1B. In the simulation, a force of 65 KN was applied to the illustrated end plates of each of FIGS. 9A and 9B resulting in reduced stress along the length of the closure member as well as the lamination of FIG. 9B in comparison to the stresses experienced by the end cap and lamination of FIG. 9A where a right angled edge is used. Specifically, the maximum von mises stress of 470 MPA was recorded on the lamination of FIG. 9A whereas the maximum von mises stress of 370 MPA was recorded on the lamination of FIG. 9B having a non-right angled edge. Non-right angled edge 12 may allow for the force applied to lamination via the cap end to be dispersed along the surface of the non-right angled edge and opposing lamination surface rather than at a straight edge creating a narrow breaking point at which forces applied to the cap end are focused, which may improve the laminations ability to resist deformation during use, may improve lamination strength and durability over time, and may provide a longer life cycle of the rotational joint in comparison to similar rotational joints using a right angled cap end.

Figure 10:
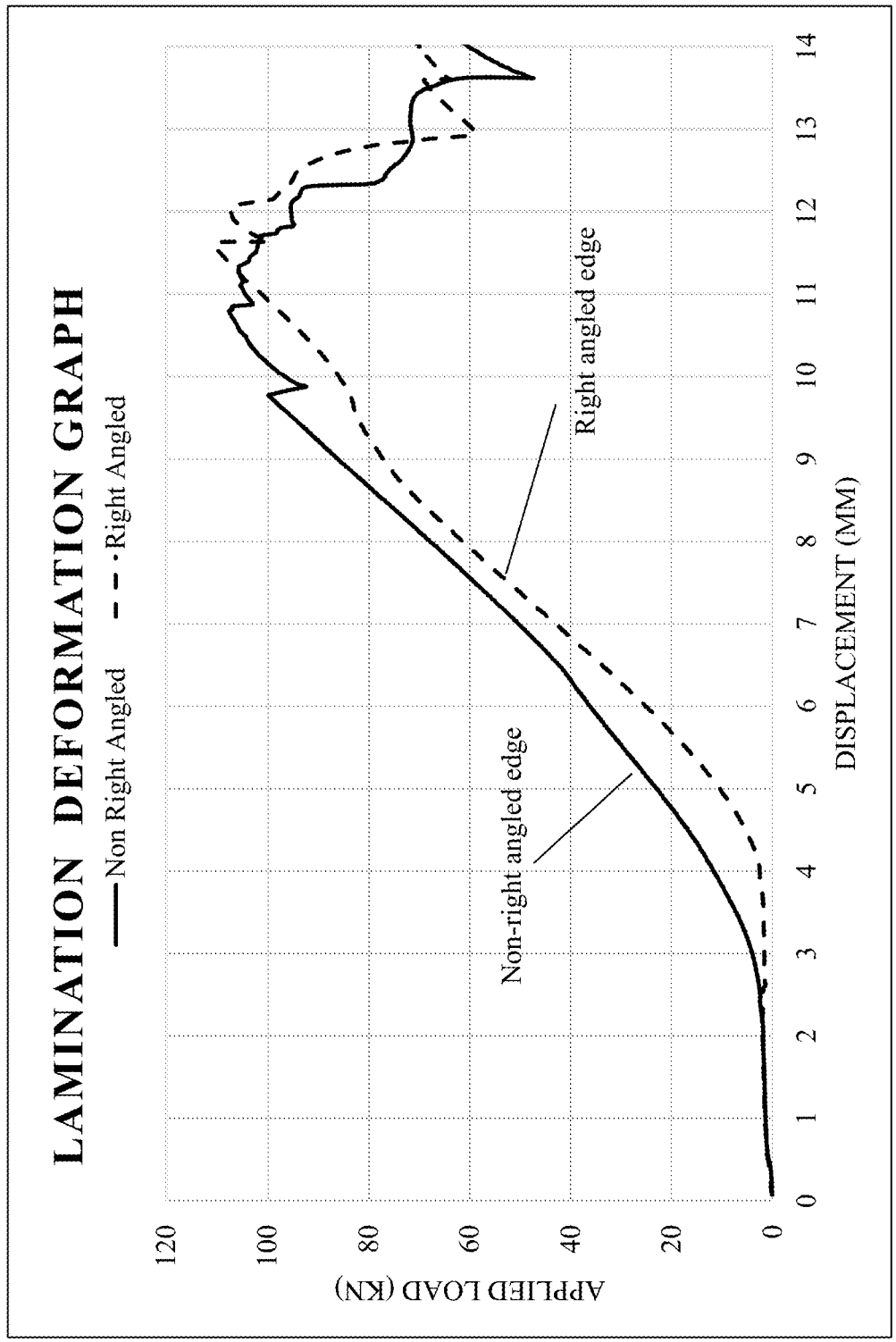
FIG. 10 shows a graph of test data for pullout load in comparison to displacement of a closure member.

FIG. 10 shows a graph of test data for pullout load in comparison to displacement of a closure member. For the test data illustrated in FIG. 10, two top-closed ball joint samples of the same design were prepared: one with cap end having non-right angled edge and the other with cap end having a right angled edge. Specifically, the non-right angled edge was a chamfered edge at about a 45° angle to adjacent external cap end surface and lateral surface, of cap end where all other variable were kept constant. The samples had a 1.5 mm thick lamination and 35 mm diameter ball of a ball stud. The stud of each ball joint was pulled applying a measured force to the cap end. The displacement of the cap end relative to its original position was also measured and plotted in FIG. 10. As shown in FIG. 10, both curves show that as stud is pulled the resulting force applied to the cap end for both right angled edge and non-right angled edge examples were displacing the cap end causing the lamination to deform. However, increased load is required to displace the end cap having a non-right angled edge in comparison to the end cap having the right angled edge. For example at 20 KN of applied load, the cap end having a non-right angled edge was displaced by approximately 1 mm less than the cap end having the right angled edge. As shown, the slope of each curve shows the non-right angled edge to have less displacement for the same applied load compared to the right-angled edge example. In other words, because the slope is higher for the non-right angled edge, closure members having a non-right angled edges may provide increased resistance to deformation of a lamination over a non-right angled edge. As a result, the non-right angled edge may reduce edge stress to increase durability and longevity of the rotational joint and components coupled to the rotational joint.

ALTERNATE EMBODIMENTS

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A rotating joint comprising:
    a housing comprising:
        an external mounting surface for coupling to a component;
        at least one internal housing member defining an internal chamber with an internal surface forming a spherical segment symmetric about a center point;
    a stud having: a longitudinal axis passing through the center point, a proximal end having a surface defining a spherical segment, the surface of the proximal end matching the internal surface of the at least one internal housing member, the proximal end configured to permit the stud to rotate about its longitudinal axis, and optionally swing to an angle relative to the center point;
    a closure member for securing the proximal end within the housing, the closure member comprising a non-right angled edge positioned between an external surface and a lateral surface of the closure member;
    a lip positioned on the housing abutting the lateral surface, the lip comprising a lamination coupled to the non-right angled edge for securing the proximal end within the internal chamber.

2. The rotating joint of claim 1, wherein the closure member is a plate defining an aperture opposite the base end, the external surface opposing a base end of the housing, the stud extending through the aperture.

3. The rotating joint of claim 1, wherein the non-right angled edge comprises an angled surface having a tangent at a first angle with respect to a first plane defined by a first tangent of the external closure member surface and a second angle with respect to a second plane defined by a second tangent of the lateral surface.

4. The rotating join of claim 3, wherein the first or second angle is in a range of 1-45 degrees, in a range of 10-30 degrees, or approximately 20 degrees.

5. The rotating join of claim 3, wherein the angled surface of the non-right angled edge has a length of: 0.5-2 mm, 0.8-1.5 mm, or greater than 1 mm.

6. The rotating join of claim 1, wherein the lamination has an approximately even thickness along the length of the lamination; a tapered cross-section; or a thickness along the length of the lamination of: greater than 0.7 mm; in a range of 1.4-2.3, and/or in a range of 1.4-1.7 mm.

7. The rotating join of claim 1, wherein a depth of the lip is: in a range of 5 mm to 10 mm, and/or in a range of 5.5 mm to 7 mm.

8. The rotating joint of claim 1, wherein the non-right angled edge comprises one of an arcuate curve, a filleted edge, a chamfered edge, or a beveled edge.

9. The rotating join of claim 1, wherein the lip couples to the non-right angled edge, the external closure member surface, and the lateral surface.

10. The rotating joint of claim 1, wherein the component is a control arm, a tie rod, a ball arm, or a stabilizer link.

11. A method comprising:
providing a housing having:
an external mounting surface for coupling to a component;
an internal chamber with an internal surface forming a spherical segment symmetric about a center point; and
a lip defining an aperture;
positioning a stud within the internal chamber, the stud having: a longitudinal axis passing through the center point, a proximal end having a surface defining a spherical segment, the surface of the proximal end matching the internal surface of the at least one internal housing member, the proximal end configured to permit the stud to rotate about its longitudinal axis, and optionally swing to an angle relative to the center point;
positioning a closure member within the housing to secure the proximal end within the housing, the closure member comprising a non-right angled edge positioned between an external surface and a lateral surface of the closure member; and
positioning the lip laterally adjacent to and abutting the closure member, the lip extending away from a plane defined by the external closure member surface;
laminating the lip to the non-right angled edge of the closure member to form a lamination.

12. The method of claim 11, wherein laminating the lip comprises forcing a die surface of a die into the lip, the die surface defining a plane positioned at an die angle relative the longitudinal axis of the housing; and moulding the lip against the non-right angled edge to form the lamination, the lamination having a length and a thickness.

13. The method of claim 12, wherein the die is a rotating die, and laminating the lip comprises:
rotating the die or the housing about a longitudinal axis of the housing at a rotational speed; and
feeding the die toward the lip at a feed speed.

14. The method of claim 12, wherein the die angle is at least one of: in a range of 45-70 degrees, and/or approximately 61.5 degrees.

15. The method of claim 12, wherein the rotational speed is at least one of in a range of 100-200 rpm, and/or approximately 150 rpm.

16. The method of claim 12, wherein the feed speed is in a range of 0.01 mm/s to 0.5 mm/s, preferably approximately 0.2 mm/s.

17. The method of claim 11, wherein the non-right angled edge comprises an angled surface having a tangent at an first angle with respect to a first plane defined by a first tangent of the external closure member surface and a second angle with respect to a second plane defined by a second tangent of the lateral surface.

18. The method of claim 17, wherein the first or second angle is: in a range of 1-45 degrees, in a range of 10-30 degrees, or approximately 20 degrees.

19. The method of claim 11, wherein the non-right angled edge comprises one of an arcuate curve, a filleted edge, a chamfered edge, or a beveled edge.

20. A mechanical assembly comprising:
a suspension or steering member coupled to a rotating joint, the rotating joint comprising:
a housing having:
an external mounting surface for coupling to a component;
at least one internal housing member defining an internal chamber with an internal surface forming a spherical segment symmetric about a center point;
a stud having: a longitudinal axis passing through the center point, a proximal end having a surface defining a spherical segment, the surface of the proximal end matching the internal surface of the at least one internal housing member, the proximal end configured to permit the stud to rotate about its longitudinal axis, and optionally swing to an angle relative to the center point;
a closure member for securing the proximal end within the housing, the closure member comprising a non-right angled edge positioned between an external surface and a lateral surface of the closure member;
a lip positioned on the housing abutting the lateral surface, the lip comprising a lamination coupled to the non-right angled edge for securing the proximal end within the internal chamber.

* * * * *